June 12, 1934.   G. R. ERICSON   1,962,861
VISCOSIMETER
Filed May 4, 1931   2 Sheets-Sheet 1
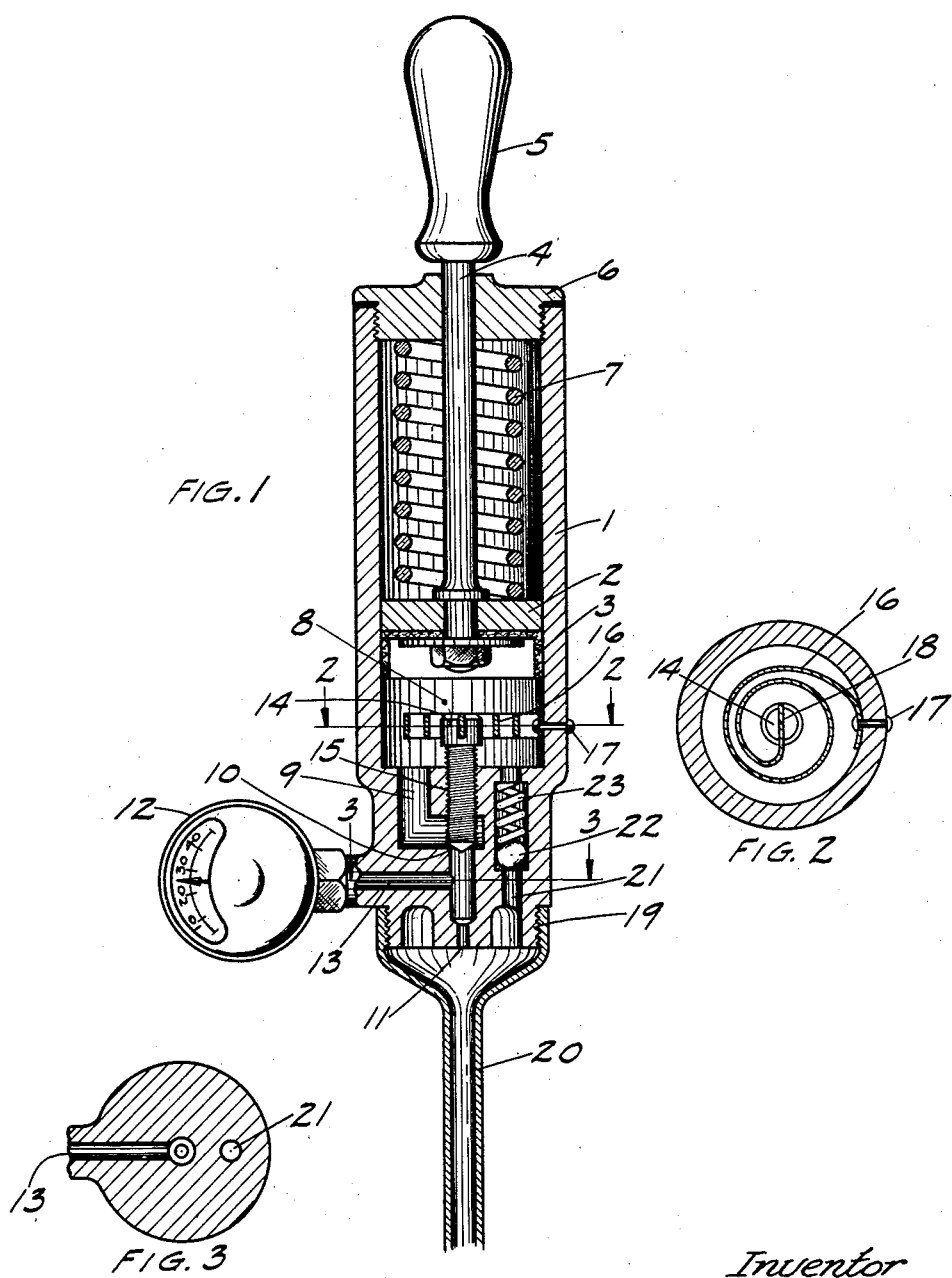
Inventor
George R. Ericson

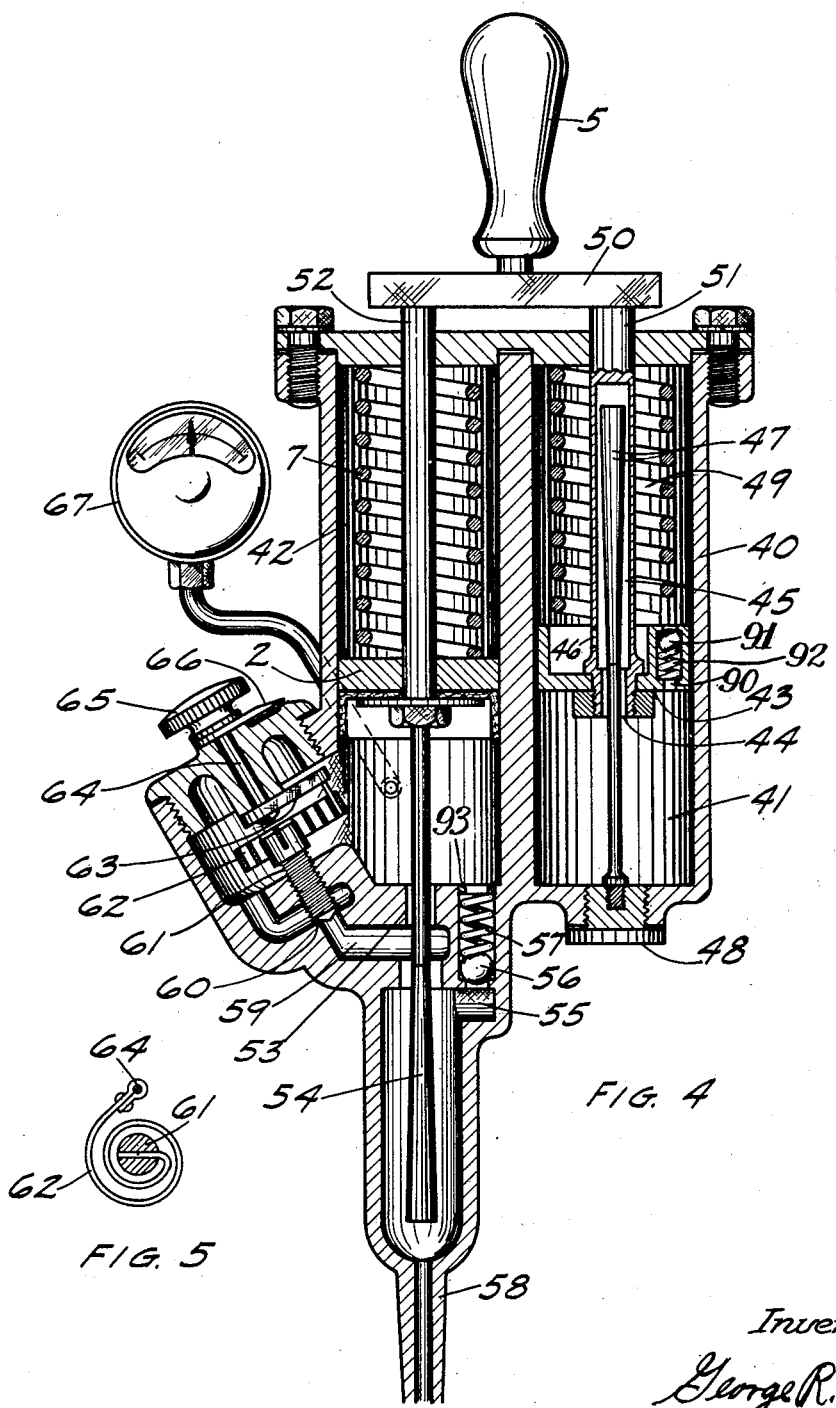

Patented June 12, 1934

1,962,861

UNITED STATES PATENT OFFICE 1,962,861

VISCOSIMETER

George R. Ericson, Maplewood, Mo.

Application May 4, 1931, Serial No. 534,880

16 Claims. (Cl. 265—11)

This invention relates to viscosity testing devices and particularly to devices for testing the character of oil in the crank cases of automotive internal combustion engines.

It is well known among automotive engineers that the necessity for frequently changing the oil in the crank case of an internal combustion engine is due to several causes, among the most important being the breaking down of the oil under heat and pressure, resulting in a dilution of the oil with a lighter hydrocarbon. Also, the heavy ends of the gasoline, which are not completely burned in the engine, condense and add to the dilution of the crank case oil.

The amount of this dilution can be readily determined by any one of a number of well known methods, but these methods, while scientifically correct, are cumbersome and of little value to the average automobile owner. The result is that automobile manufacturers recommend the changing of the crank case oil at stated mileage intervals irrespective of the actual condition of the oil.

It is the object of this invention to produce a simple and inexpensive device by means of which the condition of the oil in the crank case may readily be determined, so that, by means of charts or other tabulated information, the automobile operator can determine without delay or expense whether or not his crank case oil should be replaced.

The invention will be better understood from the following specification and accompanying drawings, which are a full, clear and exact description such as will enable any person skilled in the art to make and use the invention. Referring to the drawings:

Figure 1 shows a longitudinal sectional view of one form of the device.

Figure 2 shows a sectional view taken along the line 2—2 of Figure 1.

Figure 3 shows a sectional view taken along the line 3—3 of Figure 1.

Figure 4 shows a longitudinal sectional view of another form of the device.

Figure 5 shows a plan view of the thermostatic element of the device shown in Figure 4.

The reference numeral 1 indicates a body member of cylindrical formation having a piston 2 slidably mounted therein. A suitable packing leather 3 is provided, and a plunger is carried by a rod 4 provided with a convenient operating handle 5 as shown. The top of the cylinder is closed by a screw threaded cap 6, and a spring 7 is provided to normally maintain the plunger in discharged position.

The lower end of the cylinder 8 may be termed a compression chamber. This chamber is provided with a passageway 9 having an inlet orifice as indicated at 10, and a restricted calibrated outlet orifice as indicated at 11. A pressure gauge 12 is connected by means of a conduit 13 to that portion of the passage 9 which lies between the orifices 10 and 11. The inlet passageway 10 is variably restricted in accordance with temperature by an adjusting screw 14. This adjusting screw is screw threaded, as at 15, into the body of the cylinder 1 and is freely rotatable in the screw threads.

A thermostatic element 16 in the form of a coil has the outer end of the coil fixed to the wall of the cylinder as by the rivet 17. The inner end of the coil 16 is passed through a screw driver slot 18 in the adjusting screw 14.

It will be readily understood that the thermostatic coil 16 is formed of two metals having different coefficients of expansion with the material having the greater coefficient on the inside so that when the temperature increases, the screw 14 will be rotated in a clockwise direction, as indicated in Figure 2, and the resistance of the restricted passageway 10 will be increased—that is to say, the tip of the screw 14 acting as a valve will partially close the passageway.

The gauge 12 is graduated in S. A. E. viscosity numbers so that if the needle points to the number "30" for instance, the operator will know that his oil has the same viscosity at a given temperature as is known as S. A. E. 30.

The lower part of the cylinder is screw threaded as at 19, and a long slim nozzle 20 is attached. This nozzle may be of any size, but is preferably about ¼ or ⅕ of an inch in diameter and fifteen or twenty inches long, so that it may be readily inserted in the usual hole in the side of a crank case which is provided to carry a depth gauge.

On account of the restricted character of the passageways 10 and 11, a by-pass 21 is provided. This by-pass is controlled by a check valve 22 normally held in closed position by a spring 23. The spring may be held in position by any suitable means as, for instance, by peening over the metal after the spring and ball check are assembled, as indicated in Figure 1, or by inserting a drilled plug at the inlet end of the hole, as indicated in Figure 4. The check valve may be freely opened to permit the admission of oil into the pressure chamber 8, but it automatically closes to prevent the return of any oil, except through the passages 10 and 11.

Referring to the device shown in Figures 4 and 5, the reference numeral 40 indicates a main body member having a pair of cylinders 41 and 42 therein. The cylinder 42 corresponds generally to the cylinder 1 shown in Figure 1. The cylinder 41 carries a piston 43 having a restricted passageway 44 therein. The piston 43 has a by-pass 90 controlled by check valve 91 normally held in closed position by a spring 92. This by-pass is provided for the purpose of permitting a quick and easy movement of the piston 43 in an upward direction. The passageway 44 opens at the lower end into a compression chamber, as indicated, and at the upper end into a passageway 45 which opens out into the upper end of the cylinder through a port 46. The effective area of the restricted passageway 44 is controlled by a tapered pin 47 which is carried by a plug 48 in the lower end of the cylinder. The taper of the pin 47 is so calibrated with respect to the size and length of the hole 44 and the length and strength and state of compression of the spring 49 as to result in a downward movement of constant speed when the cylinder 41 is filled with a viscous fluid. It will readily be understood that in the absence of some control, the pressure of the spring 49 being greater when it is fully compressed than when the piston is at the lower end of the cylinder, a faster movement of the piston would occur at the top of the stroke than at the bottom. It is to avoid this difficulty that the metering pin 47 is provided. It may be noted that the cylinder 41 is filled with water, glycerine, alcohol, naptha, or some other fluid which has substantially the same viscosity at different temperatures, as distinguished from lubricating oil which has a varying viscosity at different temperatures.

A yoke 50 connects the piston rods 51 and 52 in such a manner that they may be moved together by the handle 5. A spring 7 is mounted in the upper part of the cylinder 42, and a suitable piston 2 is carried by the lower end of the rod 52. The lower part of the cylinder 42 has a calibrated restriction 53 therein, and the piston 2 carries the metering rod 54 which is tapered so as to graduate the effective area of the passageway 53 in inverse proportion to the state of compression of the spring 7. A by-pass 55 controlled by the valve 56 which is held in position by spring 57 is to admit oil to the lower part of the cylinder 42. The spring and ball check 56 are first assembled into the opening and then the plug 93 is inserted to hold the spring in, as indicated in Figure 4. Any other suitable means may be used for holding the spring in place. A conduit 58 corresponding to the conduit or nozzle 20 shown in Figure 1 is adapted to be extended into the crank case or other oil container.

A by-pass 59 is provided for discharging oil from the cylinder 42 in addition to the passage 53. This by-pass contains a valve seat 60 controlled by the valve 61 which is, in turn, operated by the thermostat 62. In this figure, the thermostat is not rigidly fixed to the wall of the cylinder, but is carried by an arm 63 having a pin 64 at its outer end. This arm is rigidly attached to the shaft 64 terminating in the operating knob 65 and having the pointer 66. This pointer may be used to set the calibration of the thermostat to correspond with the various grades of oil which might be used. For instance, the pointer could be set over a scale calibrated for medium, light, and heavy oil and, if desired, the S. A. E. numbers could be marked along the scale. When this is done, the pointer 66 is set at the number of the scale corresponding with the character of the oil being tested prior to dilution. A pressure gauge 67 corresponding to the gauge 12 shown in Figure 1 is connected to the lower part of the cylinder 42.

With reference to the device shown in Figures 1 to 3, the operation is as follows:

The nozzle 20 is inserted in the body of the oil under test, and the plunger 2 is withdrawn by means of the handle 5. A substantial quantity of oil is then drawn through the passage 9 in the by-pass 22 into the cylinder 8. If the temperature of the oil is substantially different from the temperature of the cylinder 1, it is desirable to draw in and discharge the oil two or three times in order to get the parts to somewhere near the same temperature. It will be understood that the incoming oil flows over and around the thermostat 16 which coils or uncoils and adjusts the valve 14 in such a manner that the effective capacity of the passageway 10 is calibrated inversely according to temperature. By this statement, it is meant that there is some change in the size of the passageway 10 and that the amount of change in size will be made to depend on the temperature-viscosity curve of the general type of oil being tested.

When the thermostat 16 has had sufficient amount of oil passed over it to bring it to the temperature of the oil, the compression chamber 8 is filled with oil, as previously described, and the handle 5 is released. The oil will then be discharged through the passageway 9, pass through the restricted orifice 10 and the restricted orifice 11, and some pressure will be built up in the passageway 13, due to the restriction at the orifice 11. This pressure will be registered on the gauge 12, and if the oil is thick and viscous, its passage through the orifice 11 will be greatly retarded so that a great pressure will be built up in passage 13, and the gauge will show a high viscosity, it being understood that the gauge 12 is nothing more than a pressure gauge graduated according to viscosity numbers. If the oil is thin and watery, very little pressure will be built up and the gauge will show little viscosity. If the viscosity falls below that recommended for operating that particular type of car, then the owner knows he must change his oil or else add some highly viscous oil.

The operation of the device shown in Figures 4 and 5 is substantially the same as that shown in Figures 1 to 3, except that the device is more highly refined. For instance, a constant operating speed for the plungers 2 and 43 is obtained so that no error, due to the changing length of the spring, will be introduced. Also, in this device an adjustment is provided for different types of oils.

The cylinder 41 being filled with a liquid which has a low co-efficient of viscosity change with change in temperature, the piston 43, when withdrawn against the spring 49 and released, will tend to return to the lower end of the cylinder 41 at a substantially constant rate of speed irrespective of the temperature. The cylinder 42 on the return stroke of the piston 2 will expel the oil which is being tested through passages 60 and 53, passage 60 being controlled by the thermostat and passage 53 being controlled by the metering rod 54. Due to the fact that the piston 2 would normally operate at a constant speed, variations in viscosity of the oil under test will cause greater or less pressure to be developed in front of the piston 2 as this pressure will be registered on the gauge 67. The gauge being calibrated in viscosity numbers, will instantly show the viscosity of the oil, regardless of the temperature at which it is being tested. It may be desirable, of course, to make the test several times in quick succession, particularly if the oil is very hot to enable the operating parts to approach the same temperature as that of the oil. It will be understood that the invention is susceptible of many modifications, and, accordingly, I do not wish to be limited in my protection, except as set forth in the accompanying claims.

I claim:

1. A portable viscosity testing device comprising a cylinder adapted to contain a fluid and having a restricted outlet passageway in one end thereof, a spring pressed piston in said cylinder, a thermally controlled valve for controlling the effective size of the entrance to said passageway, and a pressure gauge connected in communication with said passageway between the ends thereof.

2. In a viscosity testing device, means forming a chamber for containing a quantity of the fluid to be tested, means for creating a pressure in said chamber, a discharge conduit for releasing said fluid from said chamber, said discharge conduit having a pair of calibrated flow restricting orifices therein, a pressure gauge connected to said passageway at a point between said orifices, and thermostatic means controlling one of said orifices in accordance with the temperature.

3. In a viscosity testing device, means forming a chamber for containing a quantity of fluid to be tested, means forming a discharge passage for said chamber, said passage having a pair of spaced flow restricting portions, a valve for controlling one of said portions, a thermostat for operating said valve, the diameter of the controlled portion, the movement of the valve, and the sensitivity of the thermostat being so correlated with respect to the viscosity-temperature curve of the fluid to be tested that the amount discharged through the controlled portion at a given pressure will be the same regardless of temperature, at least between certain limits, a pressure indicator connected to said discharge passage between said portions, and a manually operable piston for subjecting fluid in said chamber to pressure.

4. In a viscosity testing device, means forming a chamber for containing a quantity of the fluid to be tested, a spring pressed discharge plunger for creating pressure on the fluid in said chamber, means forming a calibrated discharge passage for said chamber, a valve for controlling said passage, and a connection for operating said valve in accordance with the movement of said plunger.

5. In a viscosity testing device, means forming a chamber for containing a quantity of the liquid to be tested, means forming a calibrated discharge outlet for said chamber, a valve for regulating the capacity of said outlet, heat controlled means for regulating said valve, a pressure gauge connected to said chamber, a plunger for discharging said fluid from said chamber, and means for advancing said plunger at a substantially constant speed.

6. In a viscosity testing device, a cylinder having a spring pressed plunger therein, means forming inlet and outlet passageways for said cylinder, said inlet and outlet passages being joined at a point spaced from said cylinder, said outlet passage being restricted at spaced points between the junction of the outlet passage and the cylinder and the junction of the outlet and inlet passages, a pressure gauge connected to said outlet passage between said spaced points, and an inwardly opening check valve in said inlet passageway.

7. In a device of the class described, a pair of cylinders having plungers therein, one of said cylinders having a liquid of known viscosity therein, the plunger in said cylinder having a certain amount of leakage so that a dash pot action is provided, the other of said plungers having a substantially non-leaking fit, spring means for urging said plungers in one direction, means including an extended conduit adapted to be dipped into a lubricant chamber for directing lubricants into said last named cylinder when said plungers are moved in the other direction, means forming a discharge outlet to said cylinder, and a thermostatic valve controlling said discharge outlet.

8. In a viscosity testing device, means forming a cylinder, a manually operable plunger in said cylinder, said cylinder having an inlet, a tube of comparatively great length and small diameter connected with said inlet, a check valve controlling said inlet, an outlet for said cylinder communicating with said tube, and a heat responsive device for controlling the capacity of said outlet.

9. A viscosity testing device comprising means forming an expansible chamber, means for expanding and contracting said chamber, a presure gauge connected to said chamber, an outlet for said chamber, and a heat responsive device controlling said outlet.

10. In a viscosity testing device, means forming an expansible chamber, a pressure gauge connected to said chamber, a restricted passageway forming an outlet for said chamber, heat responsive means controlling said outlet, and a tube of comparatively great length and small diameter connected to said outlet, said tube being adapted for insertion into the crank case of an internal combustion engine through a small port in the side thereof.

11. In a viscosity testing device, means forming a cylinder, a piston in said cylinder, a check valve controlled inlet for said cylinder, a heat controlled device for controlling the discharge of fluid from said cylinder, a pressure gauge constructed and arranged to be subjected to the pressure of fluid discharged from said cylinder, and means for operating said piston.

12. In a viscosity testing device, means forming a cylinder, an outlet for said cylinder, heat responsive means for controlling the flow of fluid through said outlet, a piston in said cylinder, and a pressure gauge operated by pressure developed by said piston for indicating the viscosity of the fluid.

13. In a viscosity testing device for lubricating oils, a device having a chamber for receiving a quantity of the oil which is to be tested, a discharge outlet, a valve for controlling said outlet, a heat responsive device for regulating said valve, means tending to cause oil to flow from said chamber through said outlet at a constant rate, and a pressure gage for indicating the amount of pressure between said discharge means and said outlet.

14. In a viscosity testing device for lubricating oils, means forming an oil passageway, a valve for regulating the flow capacity of said passageway, a heat responsive device for regulating said valve, means tending to cause oil to flow through said passageway at a constant rate, and a pressure gage connected to said passageway between said last named means and said valve.

15. A device as claimed in the preceding claim, and in which the heat responsive device is located in and bathed by the stream of oil flowing through said valve.

16. In a viscosity testing device, means forming a chamber for containing a quantity of the liquid to be tested, means forming a discharge outlet for said chamber, a valve for regulating the flow capacity of said outlet, heat controlled means for regulating said valve, a pressure gauge connected to said chamber, a device for discharging said fluid from said chamber, and means for operating said discharging device at a substantially constant speed.

GEORGE R. ERICSON.